Feb. 27, 1940.                H. J. HORN                2,191,762

VEHICLE WHEEL

Filed March 28, 1938

INVENTOR.
HARRY J. HORN
BY
Carroll R. Taber
ATTORNEY.

Patented Feb. 27, 1940

2,191,762

UNITED STATES PATENT OFFICE 2,191,762

VEHICLE WHEEL

Harry J. Horn, Lansing, Mich., assignor to Motor Wheel Corporation, Lansing, Mich., a corporation of Michigan Application March 28, 1938, Serial No. 198,355

3 Claims. (Cl. 152—40)

This invention relates to vehicle wheels, and more particularly to vehicle wheels of the type in which the central portion is resiliently mounted with respect to the rim.

With the advent of smaller wheels and more powerful engines in automobiles, it has become necessary to provide a resilient connection in the driving mechanism between the engine and the wheel rim to reduce the shock of the changes in the torque applied by the engine. This has been done by inserting elastic devices in the drive shaft, the clutch, the universal joint, or in the drive wheels themselves.

It is accordingly an object of this invention to provide a vehicle wheel having a resilient connection between the rim and the wheel body, in order to allow relative movement in all directions between the wheel body and the rim. Another object of the invention is to provide a resilient connection between the wheel body and the rim in which is incorporated means to limit the relative movement of the rim and wheel body. Other objects of the invention are to provide a resilient wheel which is absolutely safe in operation; which is easily and economically fabricated and assembled; and on which the resilient connections are so located as to reduce the shearing stress therein to a minimum.

These objects and others ancillary thereto will become apparent in the following specification when considered in connection with the accompanying drawing, wherein like reference numerals designate corresponding parts in the several views. In the drawing.

In general, there are two types of vehicle wheels, the suspension type and the compression type. In the former, the load on the rim is carried between the top of the wheel and the rim. In the latter type the load is carried between the bottom of the wheel and the rim. Resilient connections between wheel bodies and rims of both types are disclosed herein.

Figure 1:
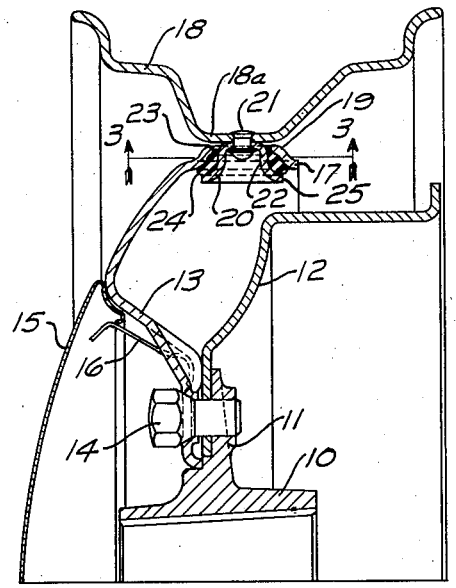
Figure 1 is a fragmentary cross-sectional view of a wheel embodying my invention.
Figure 2:
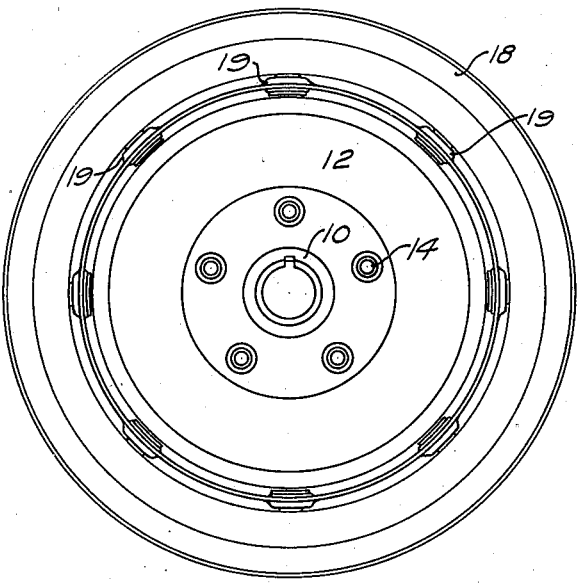
Figure 2 is a side elevational view of the complete wheel shown in Figure 1.
Figure 3:
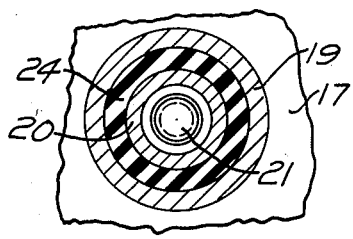
Figure 3 is a fragmentary cross-sectional view taken on substantially the line 3—3 of Figure 1.

Figures 1 to 3 illustrate the embodiment of the present invention in a suspension type wheel. The wheel there shown includes: a hub 10 having a radial flange 11; a wheel body 13 secured to the hub flange 11 by cap screws 14; a rim 18 of the conventional drop center type secured to the wheel body by the novel means to be described presently; a brake drum 12 attached to the hub flange 11 in the usual manner; and a hub cap 15 attached to wheel body 13 by means of the attaching clips 16.

The present invention resides in the novel means for attaching the rim 18 to the axially extending peripheral flange 17 of the wheel body 13. The inner surface of flange 17 is provided with a plurality of radially outwardly extending depressions 19. These depressions are preferably circular in cross-section, as illustrated in Figure 3, but may be of any other suitable configuration. An aperture 23 is formed in the bottom of each of the depressions.

The rim 18 has an annular base 18a, the circumference of which is slightly greater than the maximum circumference of the flange 17 at the depressions 19. The rim is mounted upon the wheel with its base arranged in spaced concentric relation to the radially outer surface of the depressions 19. The rim is held in this spaced relation and connected to the flange 17 by a plurality of connections including studs 20 rigidly secured to the rim by rivets 21. Each of the studs has a tubular body 22 extending through one of the apertures 23 and an enlarged inner extremity 25 of a greater diameter than the associated aperture 23. Each stud is surrounded by an annular rubber cushion 24 which is interposed between the radially inner surface of the associated depression 19 and the flared inner extremity 25 of the stud.

Thus, it will be apparent that the entire wheel load is transmitted between the rim and wheel body through the rubber cushions 24. These cushions are originally assembled under sufficient initial compression to prevent metallic contact between the rim base 18a and the radially outer surface of the depressions 19. It will also be apparent by reason of the difference in diameters between the tubular body portion of each of the studs 20 and the associated aperture 23 that, subject only to the constraining influence of the rubber cushions 24, the rim is free to move relative to the wheel body in radial, axial and circumferential directions. Thus, the rubber cushions constitute means for absorbing all kinds of shocks which are normally transmitted to the wheel body from the rim. It will be evident also that any desired amount of relative movement between the wheel body 13 and the rim 18, within practical limits, may be had by varying the relative dimensions of the tubular bodies 22 of the studs 20 and the apertures 23.

Figure 4:
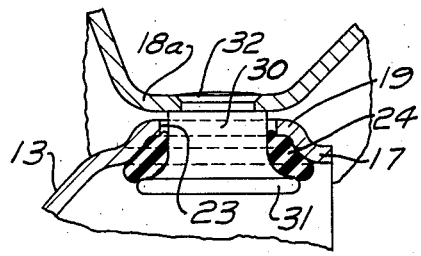
Figure 4 is a cross-sectional view of a modification of the invention.
Figure 5:
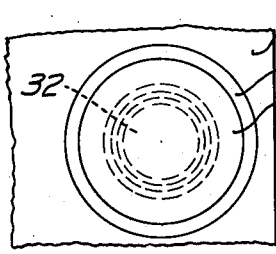
Figure 5 is a plan view of the device shown in Figure 4 from within the wheel.

The device shown in Figures 4 and 5 is generally similar to that shown in Figures 1 to 3, and it functions in the same manner. The construction of the stud 30 is somewhat different, however. In this case the stud is solid and has a flanged head 31 which serves to retain the rubber cushion 24 in the depression 19 and transmit the load from the wheel body to the rim in the same manner as the flange 25 in the modification shown in Figures 1 to 3. The rivet 32 is preferably integral with the stud 30.

Figure 6:
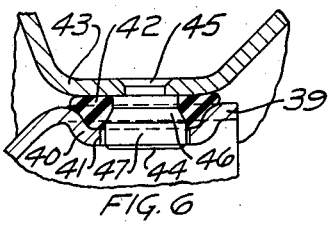
Figure 6 is a cross-sectional view of a still further modified construction.
Figure 7:
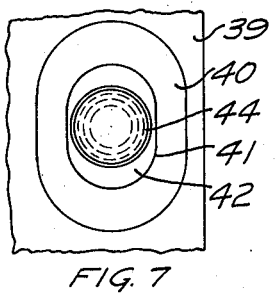
Figure 7 is a plan view of the modification of Figure 6 from within the wheel.

Figures 6 and 7 illustrate the application of the invention to a compression type of wheel. In other words, in this wheel the load is carried between the lower part of the wheel body and the rim. The wheel body has a peripheral flange 39 which is spaced radially from the base of the rim 43, whereby there may be a limited amount of relative movement in a radial direction between the wheel body and the rim. The flange 39 is provided with a plurality of depressions 40 which extend radially inward rather than radially outward as in previous devices. In the bottom of each depression is an aperture 41.

Studs 44 are connected by rivets 45, preferably integral therewith, to the base of the rim 43. The studs have frusto-conical body portions 46 and enlarged heads 47. These heads 47 extend freely through the apertures 41 and are somewhat smaller in diameter than the apertures. Consequently, the studs 47 may move axially and circumferentially with respect to the flange 39. The relative movement of the studs 44 and the wheel body is resisted by cushions in the form of rubber rings seated in the depressions 40 and surrounding the studs 47. These cushions 42 are compressed between the rim and the flange 39 of the wheel body when the parts are assembled. Due to the shape of the studs 44 the rubber cushions are compressed still more when the studs are forced into position against the base of the rim 43.

It will be seen from Figure 7 that the depressions 40 and the apertures 41 are of oval shape. They may be of any other suitable configuration, however.

Figure 8:
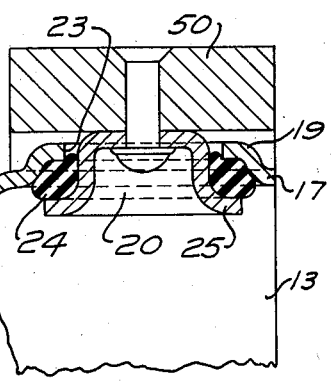
Figure 8 is a cross-sectional view of a resilient connection similar to that shown in Figure 1, but showing it applied to a different type of wheel.

Figure 8 shows the invention embodied in a solid wheel, such as might be used on railway cars. The construction of the resilient connection between the rim and the wheel body is identical with that shown in Figures 1 to 3, and its description need not be repeated here. The only difference between these devices lies in the outer rim of the wheels themselves, the rim of Figure 8 being a continuous annular band 50.

The various resilient connections between the wheel body and rim have several advantages over previous devices. One is that the wheel is absolutely safe in operation, so that even if the rubber ring should be forced from the depression in the wheel body the stud will prevent the disassociation of the wheel and rim. A further advantage is that due to the placement of the resilient connections at the periphery of the wheel body, the unit shearing stress is considerably reduced. Furthermore, it will be obvious that the construction herein shown may be readily fabricated and easily and quickly assembled.

It will be obvious, of course, that the resilient connections herein shown are capable of use in a variety of types of wheels and their form may be varied to a considerable degree. Accordingly, the scope of the invention is to be limited only by the appended claims.

I claim:

1. A vehicle wheel comprising radially spaced concentric axially extending continuous wall portions, and means for attaching said wall portions together for limited relative movement, said means consisting of a plurality of shallow recesses in one of said wall portions opening away from the other wall portion, a plurality of studs rigidly attached to said last mentioned wall portion and extending freely through complementary apertures in the bottoms of said recesses, said studs being of less diameter than said apertures and having heads on their free ends of greater diameter than said apertures, and a mass of resilient deformable material surrounding each stud and located in each recess and beneath the head of the respective stud for resisting relative movement of said wall portions.

2. A vehicle wheel comprising radially spaced concentric axially extending continuous wall portions, and means for attaching said wall portions together for limited relative movement, said means consisting of a plurality of shallow recesses in one of said wall portions opening away from the other wall portion, a plurality of studs rigidly attached to said last mentioned wall portion and extending freely through complementary apertures in the bottoms of said recesses, said studs being of less diameter than said apertures and having heads on their free ends of greater diameter than said apertures, and a mass of resilient deformable material surrounding each stud and located in each recess and beneath the head of the respective stud for resisting relative movement of said wall portions, said resilient deformable material being initially stressed when placed in said recesses.

3. A vehicle wheel comprising a rim having an axially extending annular wall and a wheel body having an axially extending peripheral flange in spaced concentric relation to said wall, and means for attaching said rim and wheel body together for limited relative movement thereof consisting of a plurality of radially inwardly opening recesses in said flange, a plurality of studs rigidly secured at their outer ends to said rim wall and extending freely through complementary apertures in the bottoms of said recesses, said studs being of less diameter than said apertures and having heads on their free ends of greater diameter than said apertures, and a mass of resilient deformable material in each recess, said material surrounding each stud and being compressed between the head of said stud and the walls of said recess.

HARRY J. HORN.